United States Patent
Zhao et al.

(10) Patent No.: US 8,531,797 B2
(45) Date of Patent: Sep. 10, 2013

(54) ANTI-SHOCK METHOD FOR HEAD STACK ASSEMBLY

(75) Inventors: Da peng Zhao, DongGuan (CN); Xiong fei Wei, DongGuan (CN); Bin Liu, DongGuan (CN); Shengxiang Chen, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 43 days.

(21) Appl. No.: 13/370,421

(22) Filed: Feb. 10, 2012

(65) Prior Publication Data

US 2013/0170073 A1    Jul. 4, 2013

(30) Foreign Application Priority Data

Dec. 29, 2011 (CN) .......................... 2011 1 0452870

(51) Int. Cl.
*G11B 21/02*    (2006.01)
*G11B 5/48*    (2006.01)

(52) U.S. Cl.
USPC ..... 360/75; 360/97.19; 360/244.9; 360/265.9

(58) Field of Classification Search
USPC ................ 360/75, 60, 25, 234.4, 128, 235.7, 360/265.7, 97.01, 244.9, 265.9, 245.7, 265.1, 360/245.3, 244.8, 97.19
See application file for complete search history.

(56) References Cited

U.S. PATENT DOCUMENTS

| | | | | |
|---|---|---|---|---|
| 6,392,843 | B1* | 5/2002 | Murphy | 360/245.3 |
| 6,556,383 | B2* | 4/2003 | Murphy et al. | 360/244.9 |
| 7,027,263 | B2* | 4/2006 | Ottesen et al. | 360/234.4 |
| 7,355,812 | B2* | 4/2008 | Byun et al. | 360/97.19 |
| 7,362,535 | B2* | 4/2008 | Kumano | 360/75 |
| 7,839,604 | B1* | 11/2010 | Coffey et al. | 360/265.9 |

* cited by examiner

*Primary Examiner* — Ali Neyzari
(74) *Attorney, Agent, or Firm* — Nixon & Vanderhye PC

(57) ABSTRACT

The present invention directs an anti-shock method for head stack assembly which carries a slider for flying on a disk for operation, and the anti-shock method includes: inputting a constant current to a head disk interface sensor which is deposited in the slider; obtaining a changing voltage of the head disk interface sensor, which is changed with the temperature of the head disk interface sensor as the slider is shocked; outputting the changing voltage to a controller with a threshold set therein; if the changing voltage is bigger than the threshold for a specified number of times, the controller is triggered to control the head stack assembly to stop operating and load on a ramp beside the disk; while if the changing voltage is small than the threshold for said specified number of times, the controller is not be triggered and the head stack assembly still operates.

8 Claims, 13 Drawing Sheets

ANTI-SHOCK METHOD FOR HEAD STACK ASSEMBLY

This application claims priority to Chinese Application No. 201110452870.9 filed 29 Dec. 2011, the entire contents of which is hereby incorporated by reference.

FIELD OF THE INVENTION

The present invention relates to information recording disk drive devices field, and more particularly, to an anti-shock method for head stack assembly.

BACKGROUND OF THE INVENTION

One known type of information storage device is a disk drive device that uses magnetic media to store data and a movable read/write head that is positioned over the magnetic media to selectively read from or write to the magnetic media. Recently, there has been an increasing demand for portable data storage devices.

Shock and collision are the two most harmful factors affecting the functionality of the disk drive when being in use. When the computer comes across the shock or collision, the reading and writing processes of the disk drive may easily be affected by unbalanced resonance frequency between the operation of the disk drive and the computer by external shocks. Therefore, an anti-shock effect is provided by an anti-shock design of the disk drive, for instance, there is a buffer designed between the disk drive and the disk drive rack. This arrangement preliminary prevents the disk drive from shock physically. Along with the development of the computer industry, all elements used in the computer have been made toward miniaturization, preciseness, high functionality and high stability. As the design of computer architecture, this additional buffer component is not desired to arranged in such compact hard disk drive, furthermore, the anti-shock function of the buffer component is merely could prevent bigger shock, and it could not stop the slider writing on/reading from the disk, so it would bring damage to the disk.

FIG. 1 provides an illustration of a typical disk drive 100. Referring to FIG. 1, a typical disk drive 100 includes a head stack assembly (HSA) 110 with one or several head gimbal assemblies (HGA) 111 having sliders thereon, a magnetic disk 120 mounted on a spindle motor 130 which causes the magnetic disk 120 to spin, and a motor base 140 to enclose the above-mentioned components. The sliders flies over the surface of the magnetic disk 120 at a high velocity to read data from or write data to concentric data tracks on the magnetic disk 120, which is positioned radially by an arm coil assembly (ACA) 112 having (e.g. by epoxy potting or overmolding) a fantail spacer 113. Generally, a voice coil motor (VCM) 114 embedded in the fantail spacer 113 is used to drive the ACA 112. The HSA 110 further includes a printed circuit board assembly (PCBA) (not shown) with a flexible printed cable (FPC) 116. The PCBA and the ACA 112 are connected together by the flexible printed cable (FPC) 116 to form an arm flexible circuit assembly (AFA).

In prior art, referring to FIGS. 1-2, a head disk interface sensor (HDI sensor) 121 is deposited in the slider to work as Touch Down detection (TD detection). The HDI sensor 121 is normally applied on a constant working current via the PCBA. When the HDI sensor 121 gets close to the rotary disk 120, the resistance of the HDI sensor 121 is changed based on the cooling effect from the rotary disk 120, then the voltage of the HDI sensor 121 is changed correspondingly. TD detection is carried out by the slider flying to touch the disk 120, and then a zero point is obtained. Based this zero point, the slider is applied on a predetermined voltage for flying on the disk 120, and based on the output changing voltage of the HDI sensor 121, the fly height is accurately under control. This HDI sensor 121 is characteristic of high sensitivity. Referring to FIGS. 1-2, a shock sensor is provided in the Drive Printed Circuit Board (Drive PCB) which is located under and connected the PCBA, for sensing the vibration of the disk drive 100 caused by the shock or the collision. When the shock sensor sense the shock or the collision, it would input changing voltage into the controller, if the voltage trigger the threshold set in the controller, the controller would close the operation current to the HSA, and control the HSA 110 to load on the ramp 117, for anti-shock protection, and the disk drive 100 stops operation. As the high accurate requirement of slider operation, the disk which the slider directly contacts to is the mainly to be protect, and the slider is the target object to be monitored. However, the traditional shock sensor is mounted in the drive PCB, and it is far from the slider, so the sensitivity of the shock sensor for sensing the shock or collision of the slider is low. This low sensitivity probably results in big damage of the disk drive, and it does not meet the high accurate requirement of slider operation.

Accordingly, a need has arisen for providing anti-shock method for head stack assembly, to overcome the above-mentioned drawbacks.

SUMMARY OF THE INVENTION

One objective of the present invention is to provide an anti-shock method for head stack assembly by employing a head disk interface sensor. Owing to depositing in the slider, the head disk interface sensor could output changing voltage with high sensitivity as the temperature is changed with the guide of the shocked slider; thereby the head stack assembly could be under high accurate control to stop operating and prevent from damage.

To achieve the above-mentioned objects, the present invention provides an anti-shock method for head stack assembly, with the head stack assembly carrying a slider for flying on a disk for operation, and the anti-shock method includes steps of inputting a constant current to a head disk interface sensor which is deposited in the slider; obtaining a changing voltage of the head disk interface sensor, which is changed with the temperature of the head disk interface sensor as the slider is shocked; outputting the changing voltage to a controller with a threshold set therein; if the changing voltage is bigger than the threshold for a specified number of times, the controller is triggered to control the head stack assembly to stop operating and load on a ramp beside the disk; while if the changing voltage is small than the threshold for said specified number of times, the controller is not be triggered and the head stack assembly still operates.

As an embodiment of the present invention, after the step of obtaining a changing voltage of the head disk interface sensor, which is changed with the temperature of the head disk interface sensor as the slider is shocked, the anti-shock method further includes providing a signal process system, having a plurality of frequency ranges and a reference table set therein, with the reference table demonstrates the relationship between the frequency ranges and the damaged component; inputting said changing voltage into the signal process system; and obtaining which component is damaged judged by the signal process system, based on the changing voltage, the frequency range and the reference table.

As another embodiment of the present invention, the signal process system further comprises a preset value and a judging number, and the step of obtaining which component is damaged judged by the signal process system, based on the changing voltage, the frequency range and the reference table further includes if the changing voltage which is input into the signal process system is beyond the preset value for more than said judging number of times, the frequency range to which said changing voltages is corresponding is obtained, and the component which is damaged is obtained based on the frequency range and the reference table.

As another embodiment of the present invention, the preset value is ranged from 15 mv to 40 mv.

As another embodiment of the present invention, the judging number of times is 200.

As still another embodiment of the present invention, the controller includes a preamp having a the comparator arranged therein, a printed circuit board assembly and a voice coil motor; the steps of outputting the changing voltage to a controller with a threshold set therein, and if the changing voltage is bigger than the threshold for a specified number of times, the controller is triggered to control the head stack assembly to stop operating and load on a ramp beside the disk, further includes outputting the changing voltage to the comparator of the preamp with the threshold set therein, the comparator comparing the changing voltage to the threshold and outing the comparison result to the printed circuit board assembly; if the changing voltage is bigger than the threshold for a specified number of times, the printed circuit board assembly controls the voice coil motor to load the head stack assembly on the ramp.

As still another embodiment of the present invention, the threshold ranges from 10 mv to 31 mv.

As still another embodiment of the present invention, said specified number of times is 255.

In comparison with the prior art, the present invention provides an anti-shock method for head stack assembly by employing a head disk interface sensor. Owing to depositing in the slider, the head disk interface sensor could output changing voltage with high sensitivity as the temperature is changed with the guide of the shocked slider; thereby the head stack assembly could be under high accurate control to stop operating and prevent from damage.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
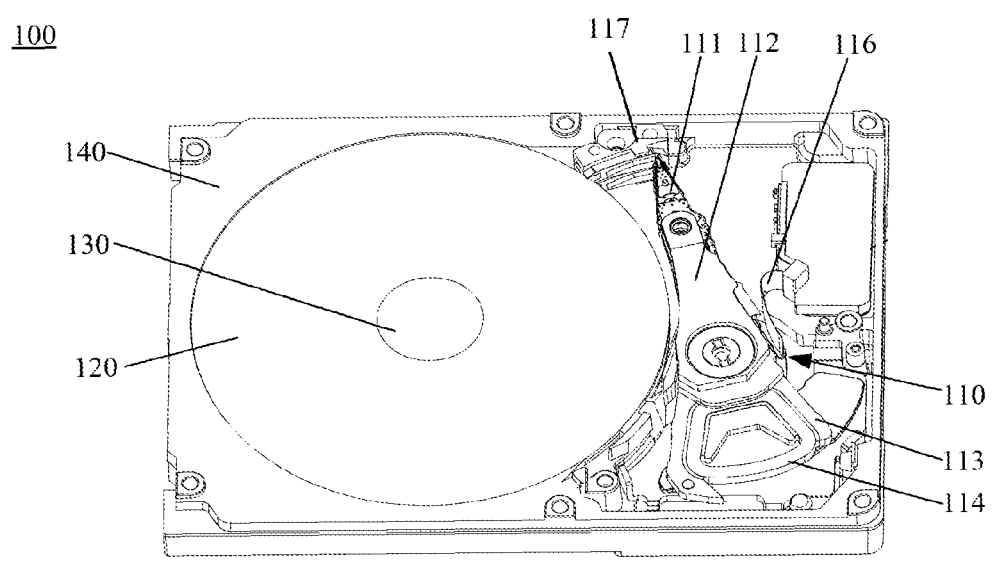
FIG. 1 is a perspective view illustrating a conventional disk drive according to the prior art.
Figure 2:
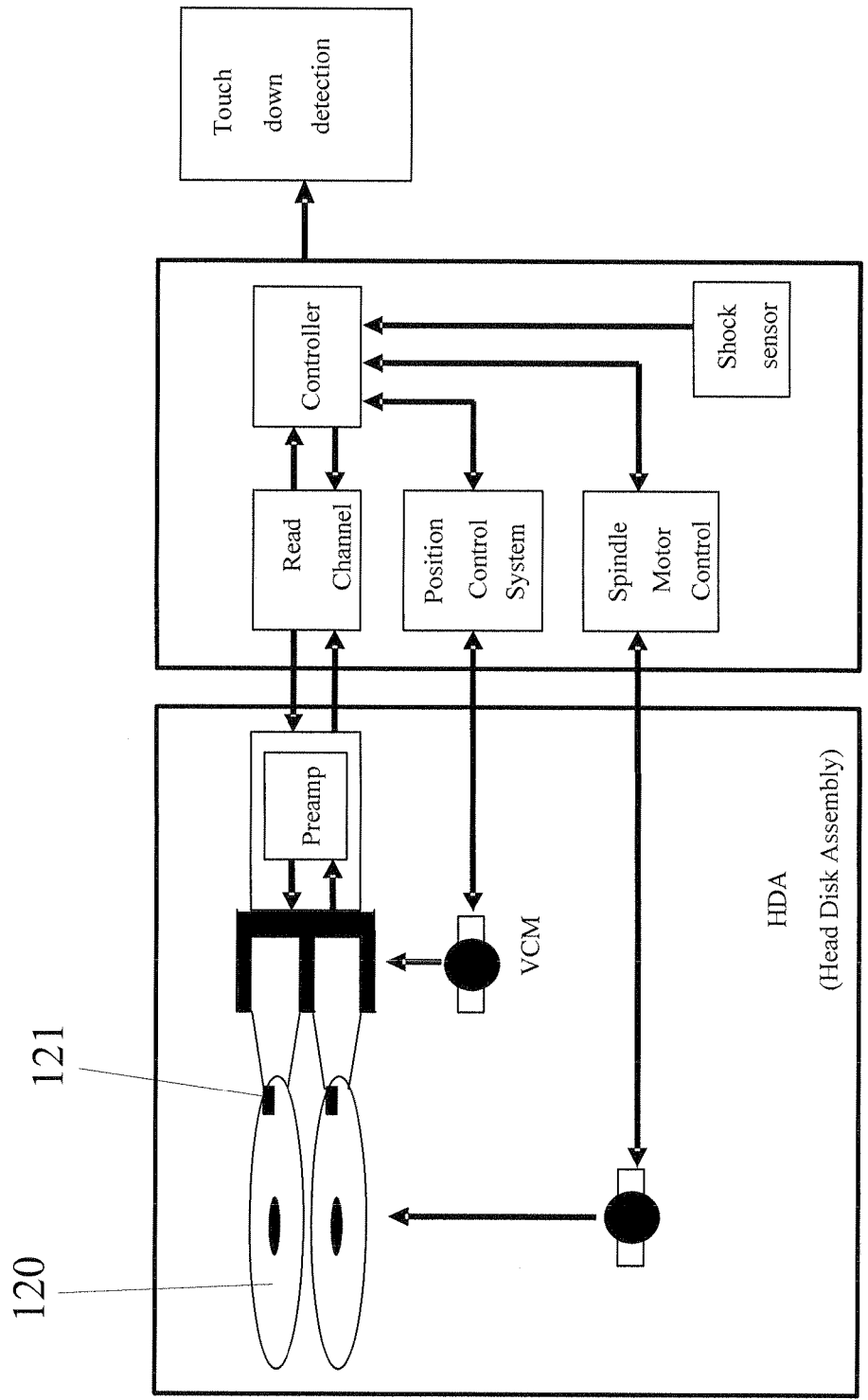
FIG. 2 is a schematic diagram illustrating a disk drive system according to the prior art.

Various preferred embodiments of the invention will now be described with reference to the figures, wherein like reference numerals designate similar parts throughout the various views.

Figure 3:
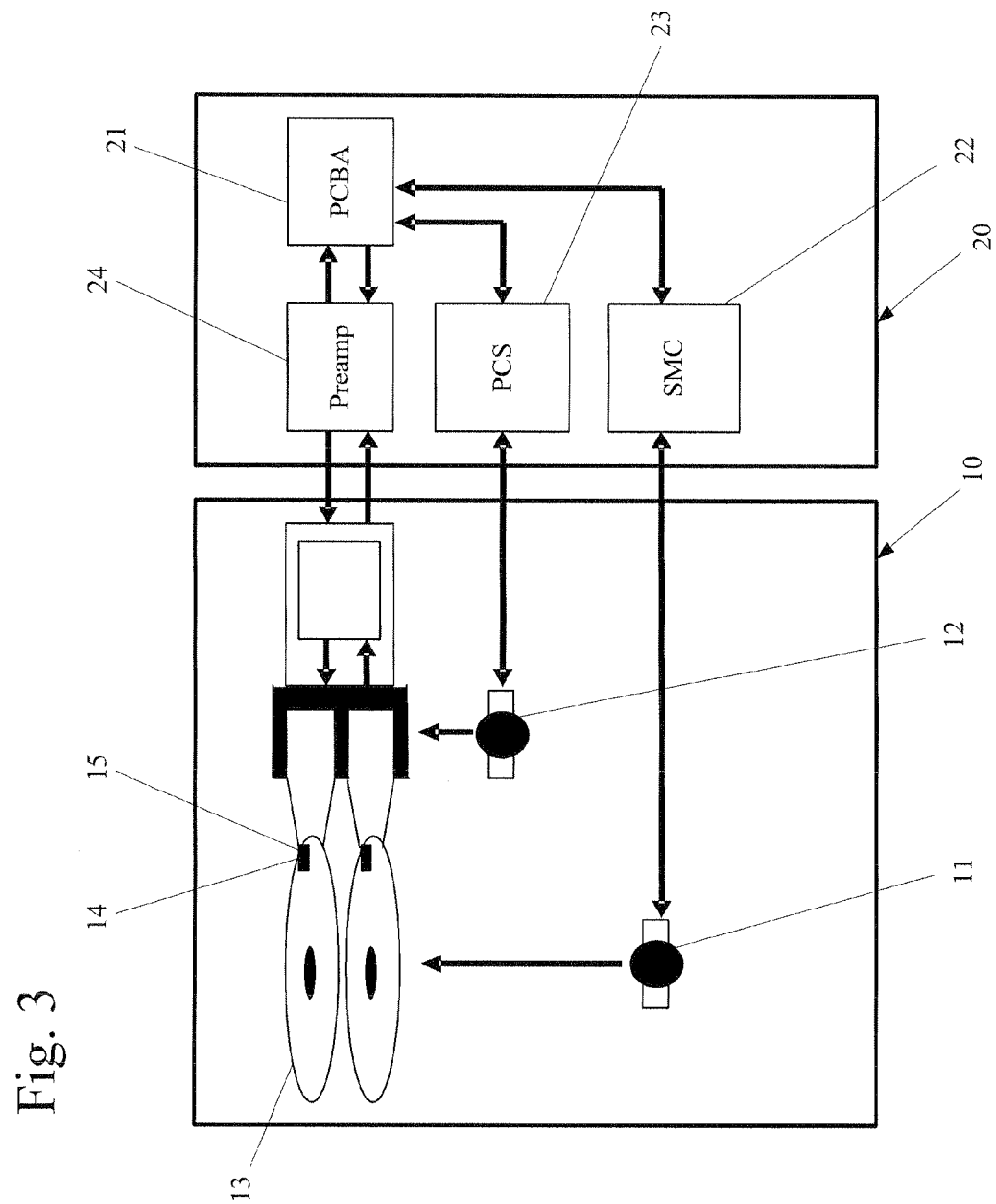
FIG. 3 is a schematic illustration illustrating a disk drive system according to the an embodiment of the invention.

Referring to FIG. 3, a hard disk drive includes two parts which are head disk assembly 10 and printed circuit board drive 20. While the hard disk drive is operated, the printed circuit board assembly (PCBA) 21 transmit control signal respectively to the spindle motor controller 22, the position control system 23 and the preamp 24 of the printed circuit board drive 20. The spindle motor 11 of the head disk assembly 10 is under control of the spindle motor controller 22 so as to causes the disk 13 to spin. The slider 14 which is carried by the head stack assembly (HSA), is flying on the disk 13 to read/write information from/to the disk 13. The voice coil motor (VCM) 12 of the head disk assembly 10 is under control of the position control system 23, so that the VCM 12 could control the HSA to position the slider 14 on the predetermined track of the disk 13.

Figure 4A:
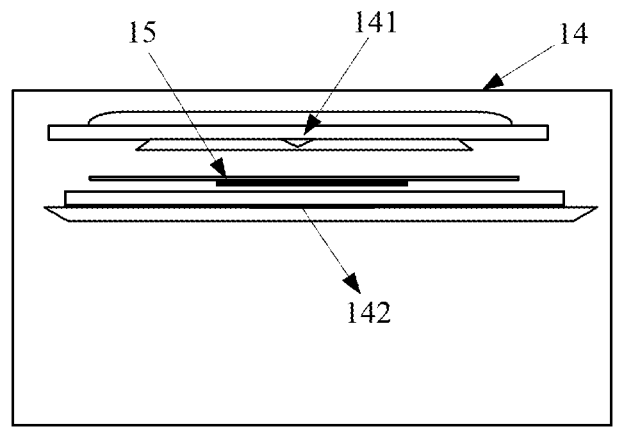
FIG. 4a is a perspective view illustrating the slider with a head disk interface sensor deposited therein according to an embodiment of the invention.
Figure 4B:
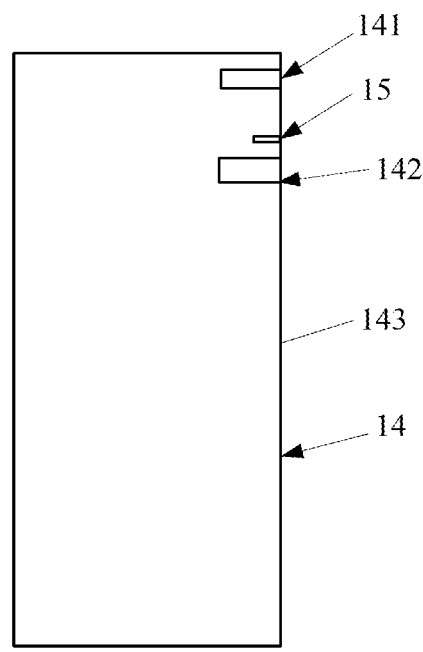
FIG. 4b is a perspective view illustrating the slider shown in FIG. 4a in another angle according to an embodiment of the invention.

Referring to FIGS. 3 and 4a-4b, a head disk interface sensor (HDI sensor) 15 is deposited in the slider 14, and it is located between the writer 141 and the reader 142. As shown in FIG. 4b, the HDI sensor 15 is located in the tip area of the slider and formed on the air bearing surface (ABS) 143 which faces the magnetic disk 13, so that HDI sensor 15 is arranged close to the disk 13. As the HDI sensor 15 is operated, it is provided with constant current, so the HDI sensor 15 is warmed up to generates heat. However, while the disk 13 is spun, the rotary disk 13 is cool and generates cool airstream, so the temperature of the HDI sensor 15 would be affected by the rotary disk 13, which is called cooling effect. When the slider 14 is shocked, the slider 14 would lift off or push down to the disk 13 time and again, owing to the slider 14 is flying above the disk 13 as operation. Detailedly, when the slider 14 lifts off the disk 13 as the spacer between the slider 14 and the disk 13 is bigger, the cooling effect between the HDI sensor 15 and the disk 13 is weaker, so the temperature of the HDI sensor 15 is higher because of the weaker cooling effect from the rotary disk 13 to the HDI sensor 15. While the slider 14 pushes down to the disk 13 as the spacer between the slider 14 and the disk 13 is smaller, the cooling effect between the HDI sensor 15 and the disk 13 is stronger, so the temperature of the HDI sensor 15 is lower, due to the stronger cooling effect from the rotary disk 13 to the HDI sensor 15. As the temperature of the HDI sensor 15 is changed all the time during the slider 14 shock, the resistance of the HDI sensor 15 is changed with the guide of the temperature thereof.

Figure 5:
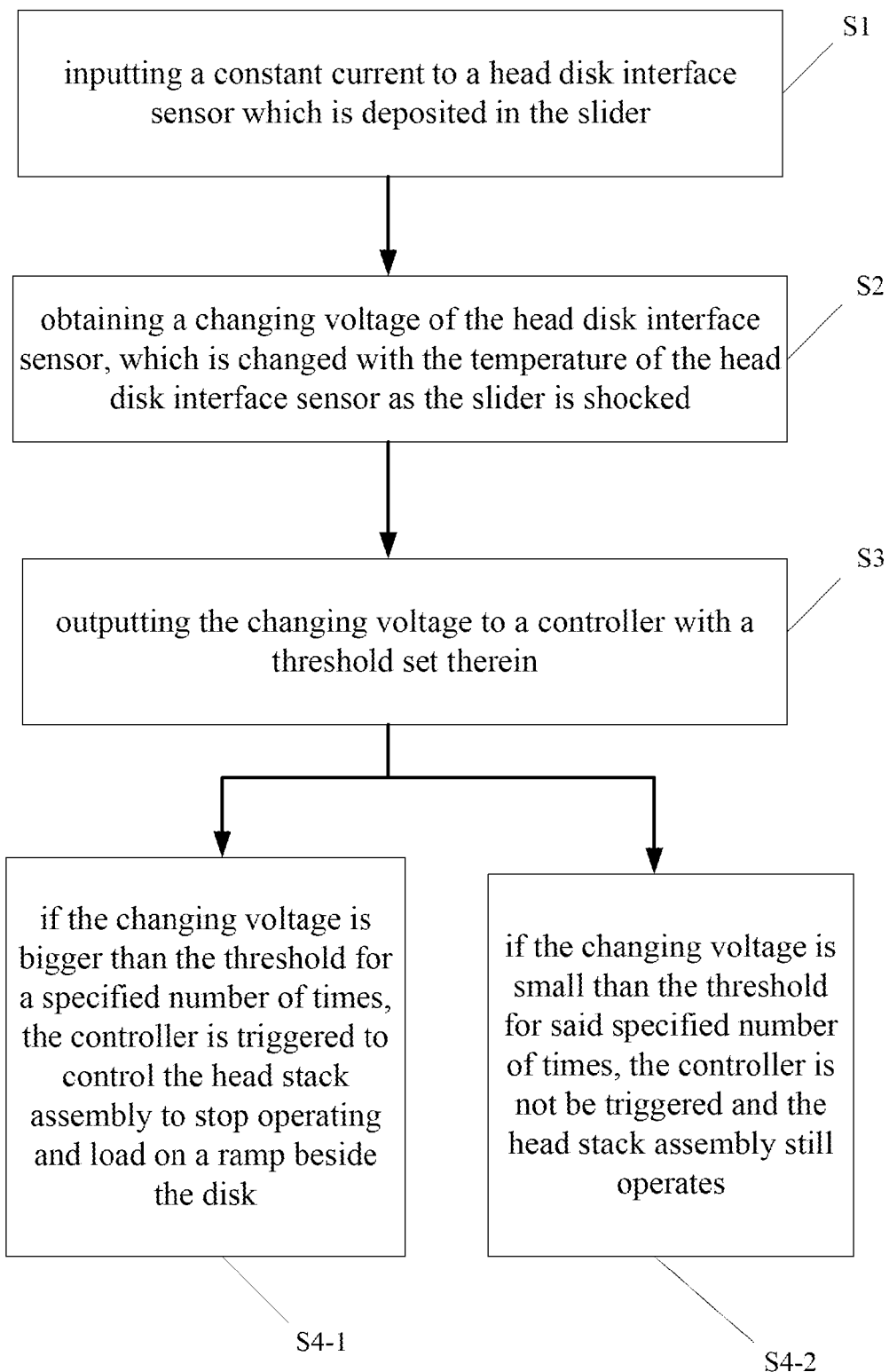
FIG. 5 is a flow chat illustrating the anti-shock method for head stack assembly according to an embodiment of the invention.

Referring to FIG. 5, in one embodiment of the present invention, the anti-shock method for head stack assembly according to the present invention generally includes the following steps: step one: inputting a constant current to a head disk interface sensor which is deposited in the slider (S1); step two: obtaining a changing voltage of the head disk interface sensor, which is changed with the temperature of the head disk interface sensor as the slider is shocked (S2); step three: outputting the changing voltage to a controller with a threshold set therein (S3); step four: if the changing voltage is bigger than the threshold for a specified number of times, the controller is triggered to control the head stack assembly to stop operating and load on a ramp beside the disk (S4-1); while if the changing voltage is small than the threshold for said specified number of times, the controller is not be triggered and the head stack assembly still operates (S4-2).

Referring to FIGS. 3 and 5, in the step one of the anti-shock methods for head stack assembly, an operation current which is constant current is input into the head disk interface sensor 15 which is deposited in the slider 14, from the PCBA 21 to the preamp 24.

Referring to FIGS. 3 and 5, during step two, when shocked, the slider 14 is lifted off or pushed down to the disk 13 time and again, so that the cooling effect is generated between the HDI sensor 15 and the rotary disk 13. As mentioned above, the resistance of the HDI sensor 15 would changed with the cooling effect. As the operation current of the HDI sensor 15 is constant, the voltage thereof is changed with the resistance, that is, the voltage of the HDI sensor 15 is changing with the temperature thereof owing to the cooling effect. Therefore, the changing voltage of the HDI sensor 15 is obtained in this step.

Referring to FIG. 5, in step three according to this embodiment, the controller includes the preamp 24, the PCBA 21, the position control system 23 and the VCM 12. The preamp 24 has a comparator arranged therein, with a threshold set in the comparator. The threshold could be the voltage ranged from 10 mv to 31 mv. The changing voltage of the HDI sensor is output into the comparator of the preamp 24 in step three.

Figure 6A:
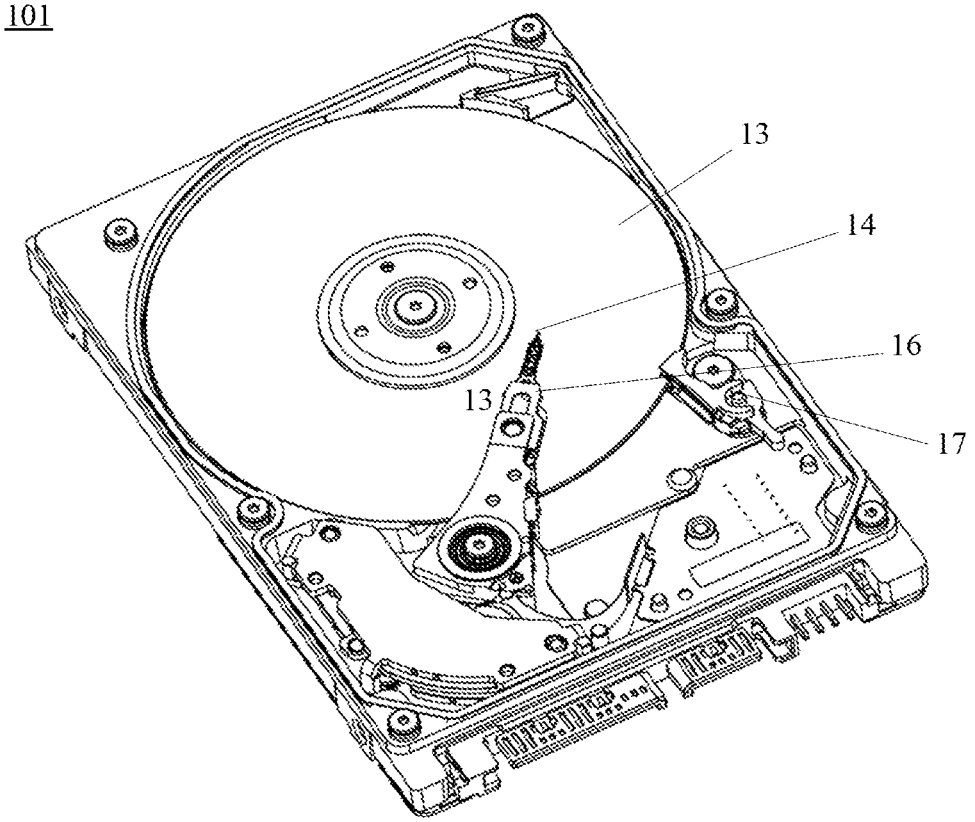
FIG. 6a is a perspective view illustrating an operating disk drive according to an embodiment of the invention.
Figure 6B:
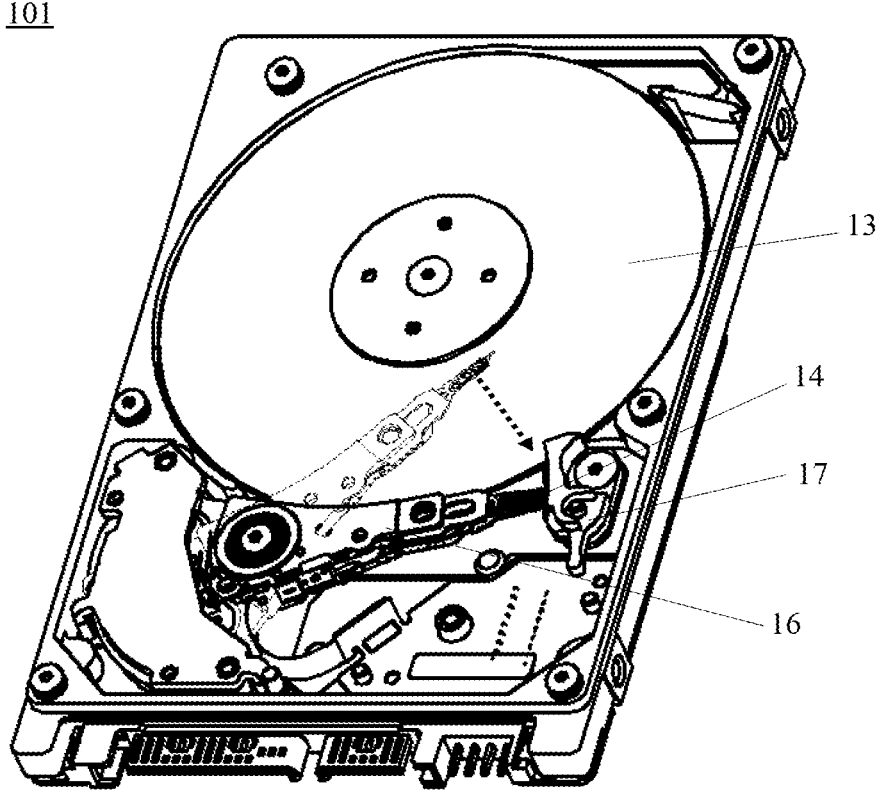
FIG. 6b is a perspective view illustrating the disk drive is stop operating according to an embodiment of the invention.

Referring to FIG. 6a-6b, the disk drive 101 includes a ramp 17, while the slider 14 carried by the HSA 16 is flying on the disk 13 for reading/writing information from/to thereto, the disk drive 101 is operated. When the disk drive 101 is stop operating, the HSA 16 is transferred to the ramp 17 which is located besides the disk 13, for resting the slider 14 on the ramp 17 and prevents the slider 14 from colliding to the disk 13.

Figure 7:
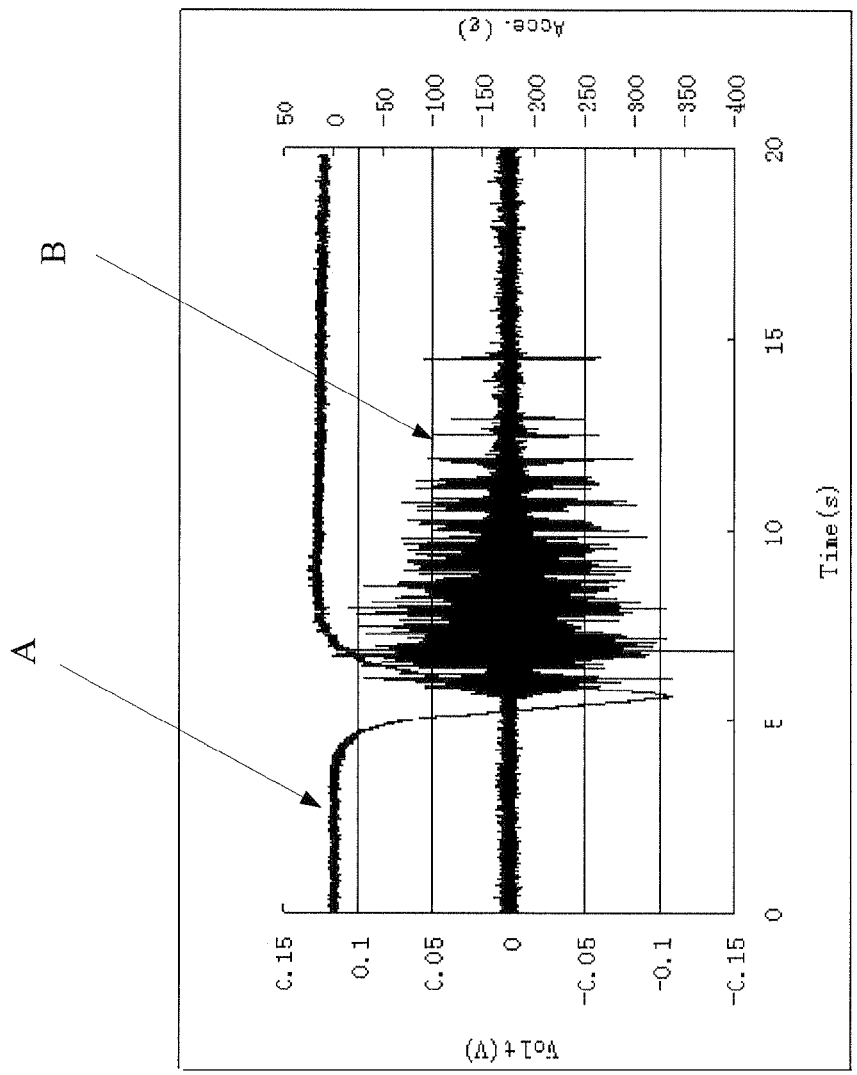
FIG. 7 is a graph illustrating the changing voltage of the head disk interface sensor and the shock input line according to an embodiment of the invention.
Figure 8A:
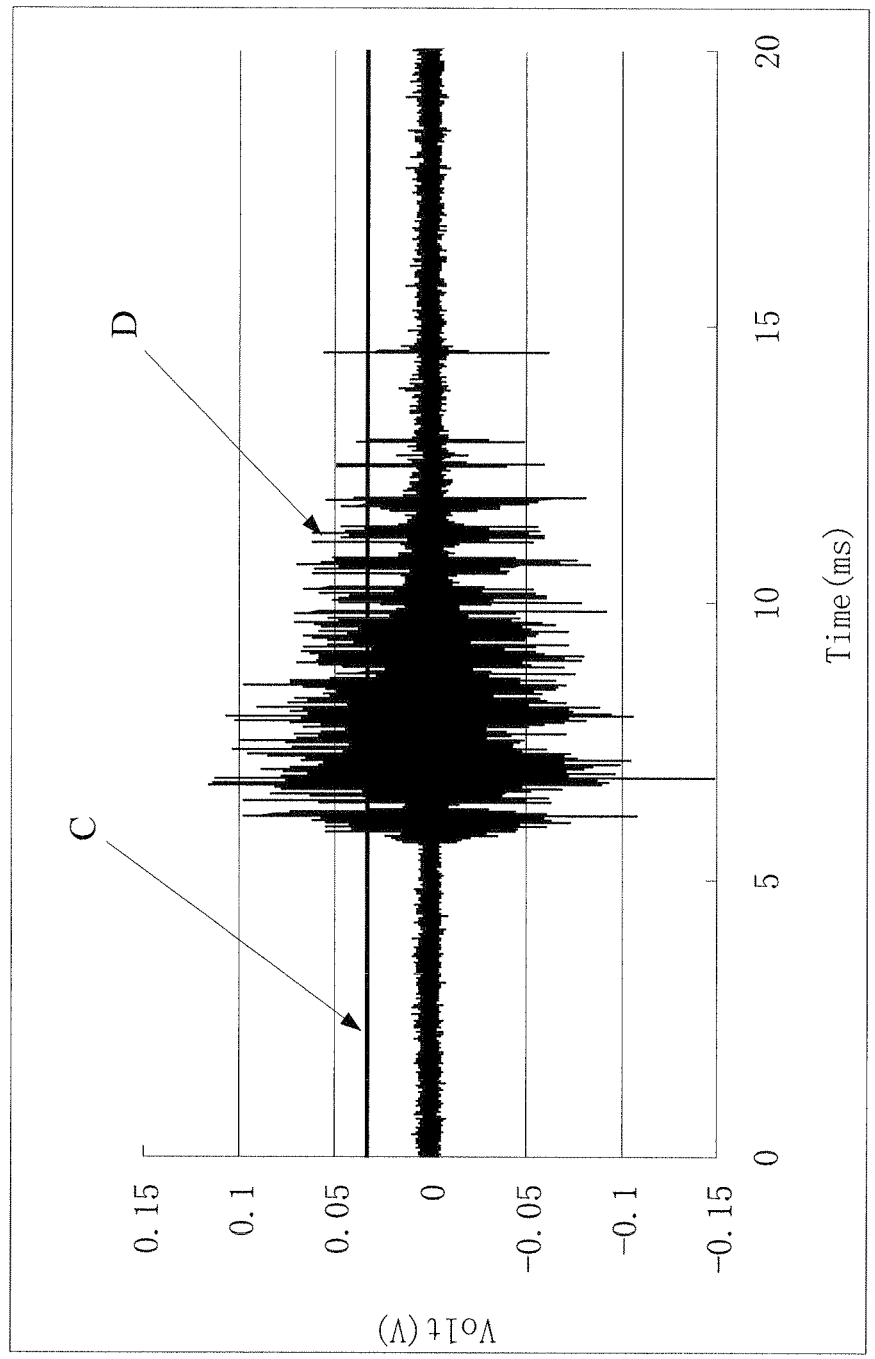
FIG. 8a is a graph illustrating the changing voltage of the head disk interface sensor according to an embodiment of the invention.
Figure 8B:
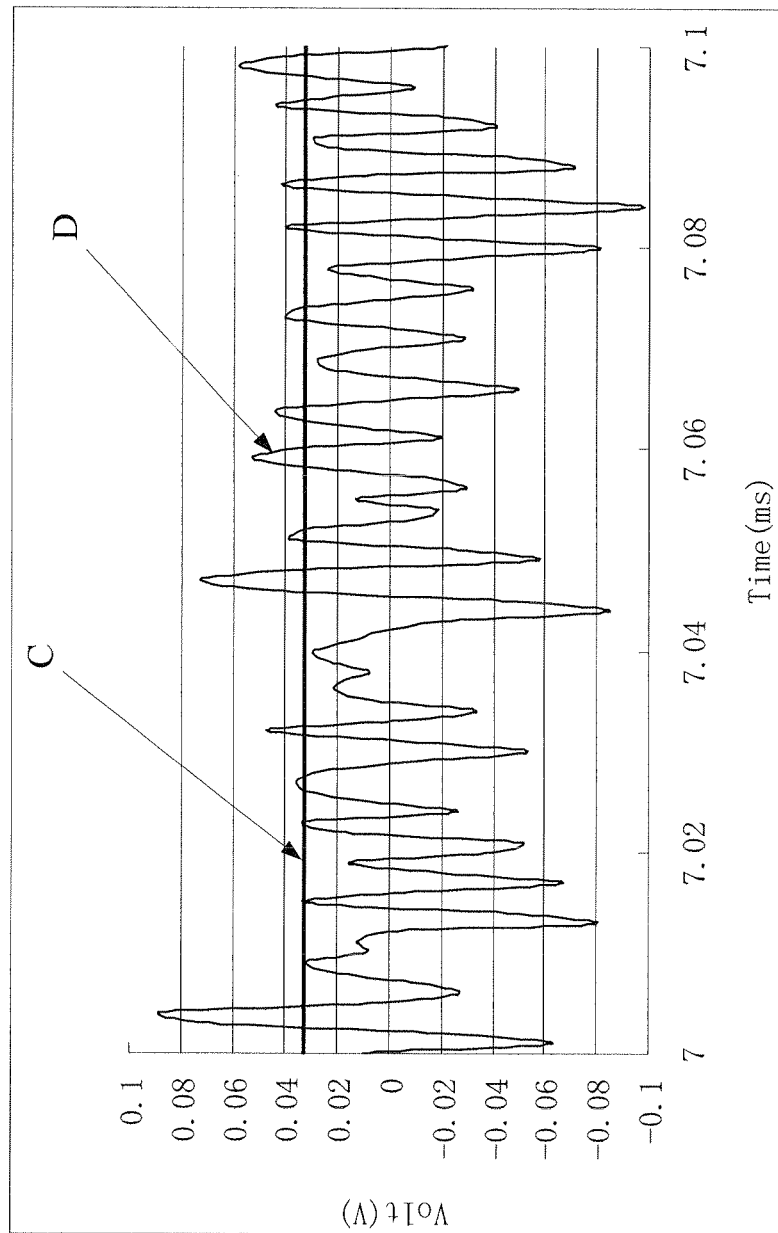
FIG. 8b is partial graph of FIG. 8a illustrating the changing voltage of the head disk interface sensor according to an embodiment of the invention.

Referring to FIGS. 3-8b, in step 4, the threshold is 31 mv according to this embodiment, and the threshold in the comparator could be another value from the scope of 10 mv to 31 mv. Because the slider is shocked, the cooling effect between the HDI sensor 15 and the disk 13 is changed all the time, and the changing voltage is changed with the cooling effect. The comparator of the preamp 24 compares the changing voltage of the HDI sensor 15 to the threshold. If the changing voltage is bigger than the threshold for a specified number of times, the preamp 24 output the first comparison result to the PCBA 21, and the PCBA 21 is triggered with this first comparison result. The PCBA 21 forwards triggered signal to the position control system 23, then the position control system 23 transmits controlling signal to VCM 12, and the VCM 12 controls the HSA 16 to stop operating and load on the ramp 17 which is located besides the disk 13, as shown in FIG. 6b. Simultaneity, the PCBA 21 generates stopping signal to the preamp 24, and the preamp 24 processes the signal and controls the slider 14 to stop operating. As such, the slider 13 and the HSA 16 are prevented from colliding to the disk 13, and the whole disk drive 101 could avoid damage. Contrariwise, if the changing voltage is small than the threshold for said specified number of times, the PCBA 21 is not be triggered and the HSA 16 still operates. In this embodiment, the above-mentioned specified number of times is 255; in other embodiments, the specified number of times could be another number. As shown in FIG. 7, the curved line A is a shock inputting signal, and the line B illustrates the changing voltage of the HDI sensor according to the present invention. Referring to FIGS. 8a-8b, line C demonstrates the threshold, and line D illustrates the changing voltage of the HDI sensor.

Figure 9:
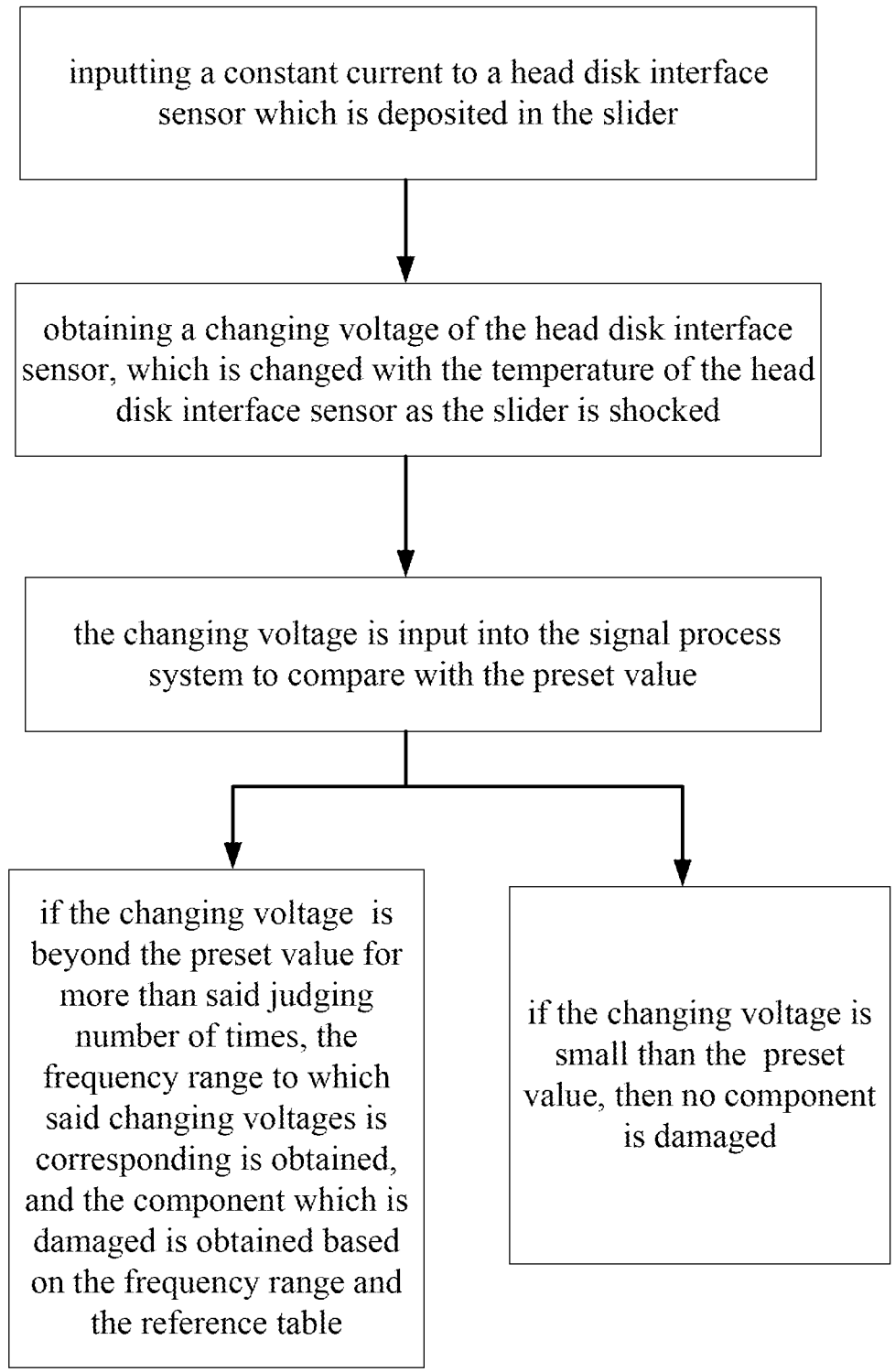
FIG. 9 is a flow chat illustrating the anti-shock method for head stack assembly according to another embodiment of the invention.
Figure 10:
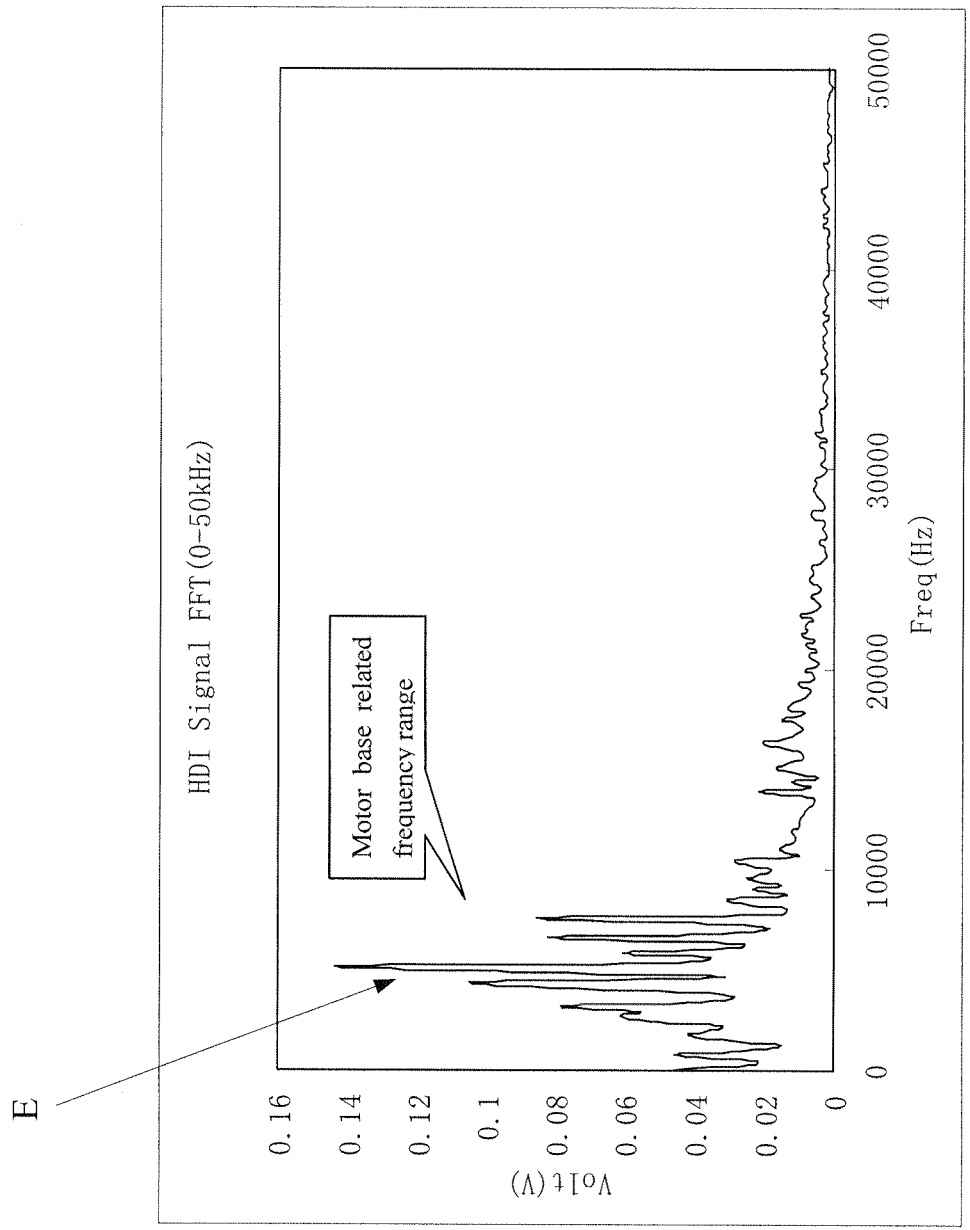
FIG. 10 is a graph illustrating the changing voltage of the head disk interface sensor in a frequency range according to an embodiment of the invention.
Figure 11:
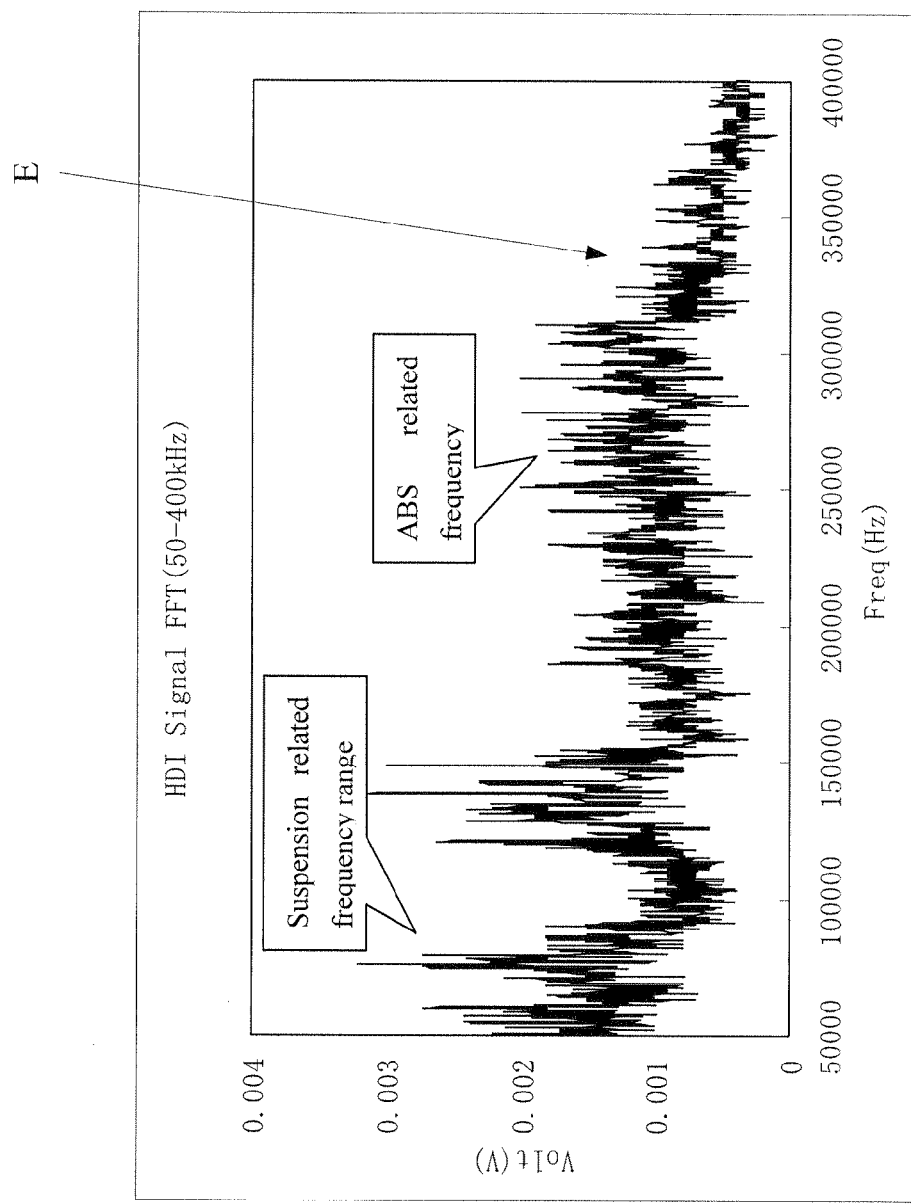
FIG. 11 is a graph illustrating the changing voltage of the head disk interface sensor in another frequency range according to an embodiment of the invention.

Referring to FIGS. 9-11, in the second embodiment of the present invention, a signal process system having a plurality of frequency ranges and reference table set therein, with the reference table demonstrates the relationship between the frequency ranges and the damaged component. Further, the signal process system also has a preset value and a judging number set therein. After the step of obtaining a changing voltage of the HDI sensor, the changing voltage is input into the signal process system to compare with the preset value, if the changing voltage which is input into the signal process system is beyond the preset value for more than said judging number of times, the frequency range to which said changing voltages is corresponding is obtained, and the component which is damaged is obtained based on the frequency range and the reference table. If the changing voltage is smaller than the preset value, then no component is damaged. For example, as shown in FIG. 10, line E shows the changing voltages, and the frequency of 1-1000 Hz is corresponding to the motor base component, as the changing voltage goes beyond the preset value of 40 mv for 200 times, the motor base component could be judged to be the damage component. As shown in FIG. 11, for another example, line E shows the changing voltages, and the frequency of 5000-10000 Hz is corresponding to the suspension component, as the changing voltage goes beyond the preset value of 18 mv for 200 times, the suspension component could be judged to be the damage component. And, the frequency of 25000-30000 Hz is corresponding to the air bearing surface of the slider, as the changing voltage goes beyond the preset value of 15 mv for 200 times, the air bearing surface of the slider could be judged to be the damage component. Owing to the signal process system, when the disk drive is shocked, the damage component could be found on line, without taking apart the whole disk drive. In this embodiment, the preset value is ranged from 15 mv to 40 mv, and the judging number of times is 200; in other embodiments, the preset value and the judging number of times could be other values.

It should be note that the damaged component may be the core component which causes the HSA could not operate normally, but it functions normally in any other independent testing which is merely for itself and without supporting any other co-operative work; the damaged component may be the component not only causes the HSA could not operate normally, but also could not functions normally by itself in any other independent testing without supporting any other co-operative work.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An anti-shock method for head stack assembly, with the head stack assembly carrying a slider for flying on a disk for operation, comprising:
    inputting a constant current to a head disk interface sensor which is deposited in the slider;
    obtaining a changing voltage of the head disk interface sensor, which is changed with the temperature of the head disk interface sensor as the slider is shocked;
    outputting the changing voltage to a controller with a threshold set therein;
    if the changing voltage is bigger than the threshold for a specified number of times, the controller is triggered to control the head stack assembly to stop operating and load on a ramp beside the disk; while if the changing voltage is small than the threshold for said specified number of times, the controller is not be triggered and the head stack assembly still operates.

2. The anti-shock method for head stack assembly according to claim 1, wherein after the step of obtaining a changing voltage of the head disk interface sensor, which is changed with the temperature of the head disk interface sensor as the slider is shocked, the anti-shock method further comprises:
    providing a signal process system, having a plurality of frequency ranges and reference table set therein, with the a reference table demonstrates the relationship between the frequency ranges and the damaged component;
    inputting said changing voltage into the signal process system; and
    obtaining which component is damaged judged by the signal process system, based on the changing voltage, the frequency range and the reference table.

3. The anti-shock method for head stack assembly according to claim 2, wherein the signal process system further comprises a preset value and a judging number, and the step of obtaining which component is damaged judged by the signal process system, based on the changing voltage, the frequency range and the reference table further comprises:
    if the changing voltage which is input into the signal process system is beyond the preset value for more than said judging number of times, the frequency range to which said changing voltages are corresponding is obtained, and the component which is damaged is obtained based on the frequency range and the reference table.

4. The anti-shock method for head stack assembly according to claim 3, wherein the preset value is ranged from 15 mv to 40 mv.

5. The anti-shock method for head stack assembly according to claim 3, wherein the judging number of times is 200.

6. The anti-shock method for head stack assembly according to claim 1, wherein the controller comprises a preamp having a comparator arranged therein, a printed circuit board assembly and a voice coil motor; the steps of outputting the changing voltage to a controller with a threshold set therein, and if the changing voltage is bigger than the threshold for a specified number of times, the controller is triggered to control the head stack assembly to stop operating and load on a ramp beside the disk, further comprises:
    outputting the changing voltage to the comparator of the preamp with the threshold set therein, the comparator comparing the changing voltage to the threshold and outing the comparison result to the printed circuit board assembly;
    if the changing voltage is bigger than the threshold for a specified number of times, the printed circuit board assembly controls the voice coil motor to load the head stack assembly on the ramp.

7. The anti-shock method for head stack assembly according to claim 1, wherein the threshold ranges from 10 mv to 31 mv.

8. The anti-shock method for head stack assembly according to claim 1, wherein said specified number of times is 255.

* * * * *